United States Patent
Zimmermann et al.

[11] Patent Number: 6,099,153
[45] Date of Patent: Aug. 8, 2000

[54] EXTERIOR REARVIEW MIRROR FOR VEHICLES, PREFERABLY MOTOR VEHICLES

[75] Inventors: Werner Zimmermann, Ottenbach; Bernd Waldmann, Nuertingen; Helmut Eberspächer, Esslingen, all of Germany

[73] Assignee: Reitter & Schefenacker GmbH & Co. KG, Germany

[21] Appl. No.: 09/025,379

[22] Filed: Feb. 18, 1998

[30] Foreign Application Priority Data

Feb. 18, 1997 [DE] Germany ............. 297 02 746 U

[51] Int. Cl.[7] ..................................... B60Q 1/26
[52] U.S. Cl. ................ 362/494; 362/511; 362/545
[58] Field of Search ..................... 362/492, 494, 362/503, 511, 555, 560, 135, 143, 545; 359/844

[56] References Cited

U.S. PATENT DOCUMENTS 4,792,884  12/1988  Suman et al. .................. 362/135
5,402,103   3/1995  Tashiro ........................... 362/135

*Primary Examiner*—Y. Quach
*Attorney, Agent, or Firm*—Robert W. Becker & Associates

[57] ABSTRACT

An exterior rearview mirror for motor vehicles has a housing and a mirror pane pivotably supported in the housing. A light source is mounted in the housing. The housing has an outlet opening through which light emitted by the light source exits the housing. A light guide at least partially fills the outlet opening and is connected within the interior of the housing to the light source.

14 Claims, 3 Drawing Sheets

EXTERIOR REARVIEW MIRROR FOR VEHICLES, PREFERABLY MOTOR VEHICLES

BACKGROUND OF THE INVENTION

The present invention relates to an exterior rearview mirror for vehicles, preferably motor vehicles, comprising a mirror housing in which a mirror support plate is pivotably supported and in which at least one light source is provided that has coordinated therewith at least one light outlet opening.

Exterior rearview mirrors are known in which the mirror housing is provided with an auxiliary turn signal light. As a light source an incandescent light bulb is usually employed whose light will exit through the light outlet opening of the housing to the exterior. An incandescent light bulb generates a considerable amount of heat within the mirror housing and has a relatively short service life. Furthermore, the incandescent light bulb requires a large space and complicated assembly parts within the mirror housing.

It is therefore an object of the present invention to embody an exterior rearview mirror of the aforementioned kind such that a simple and inexpensive mounting of the light source within the mirror housing is provided.

SUMMARY OF THE INVENTION

The exterior rearview mirror for motor vehicles according to the present invention is primarily characterized by:

A housing;

A mirror pane pivotably supported in the housing;

A light source mounted in the housing;

The housing having an outlet opening through which light emitted by the light source exits the housing;

A light guide at least partially filling the outlet opening and connected within the interior of the housing to the light source.

Advantageously, the light guide completely fills the outlet opening.

The light guide expediently consists of clear plastic material.

The light source may be an LED.

Advantageously, the light guide has an outer side and the outer side is positioned at least partially within the outer contour of the housing.

The light guide rests at the inside surface of the housing. Advantageously, the light guide has a main body and at least one support part, wherein the support part rests at the inside surface of the housing.

The support part is preferably an edge portion of the light guide and extends at least partly along the circumference of the main body.

Preferably, the support part has a reduced thickness relative to the thickness of the main body.

The light guide is preferably detachably mounted in the housing.

Preferably, the mirror comprises at least one holder for securing the light guide at the housing.

The at least one holder is detachably secured at the inside surface of the housing. The at least one holder includes at least one seal resting at the inside surface of the housing.

Advantageously, the at least one holder is spaced from the light guide within the area of the outlet opening.

The inventive exterior rearview mirror is provided with a light outlet opening that is at least partially, advantageously completely, filled by a light guide. The light emitted by the light source can be simply guided through the light guide to the light outlet opening. The use of a light guide has the advantage that the light source can be provided in the form of at least one LED. The light guide is then connected to the LED. A simple assembly of the mirror housing and the light guide is possible so that the exterior rearview mirror can be easily assembled and manufactured. The light guide and the light source are advantageously used as an auxiliary turn signal.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
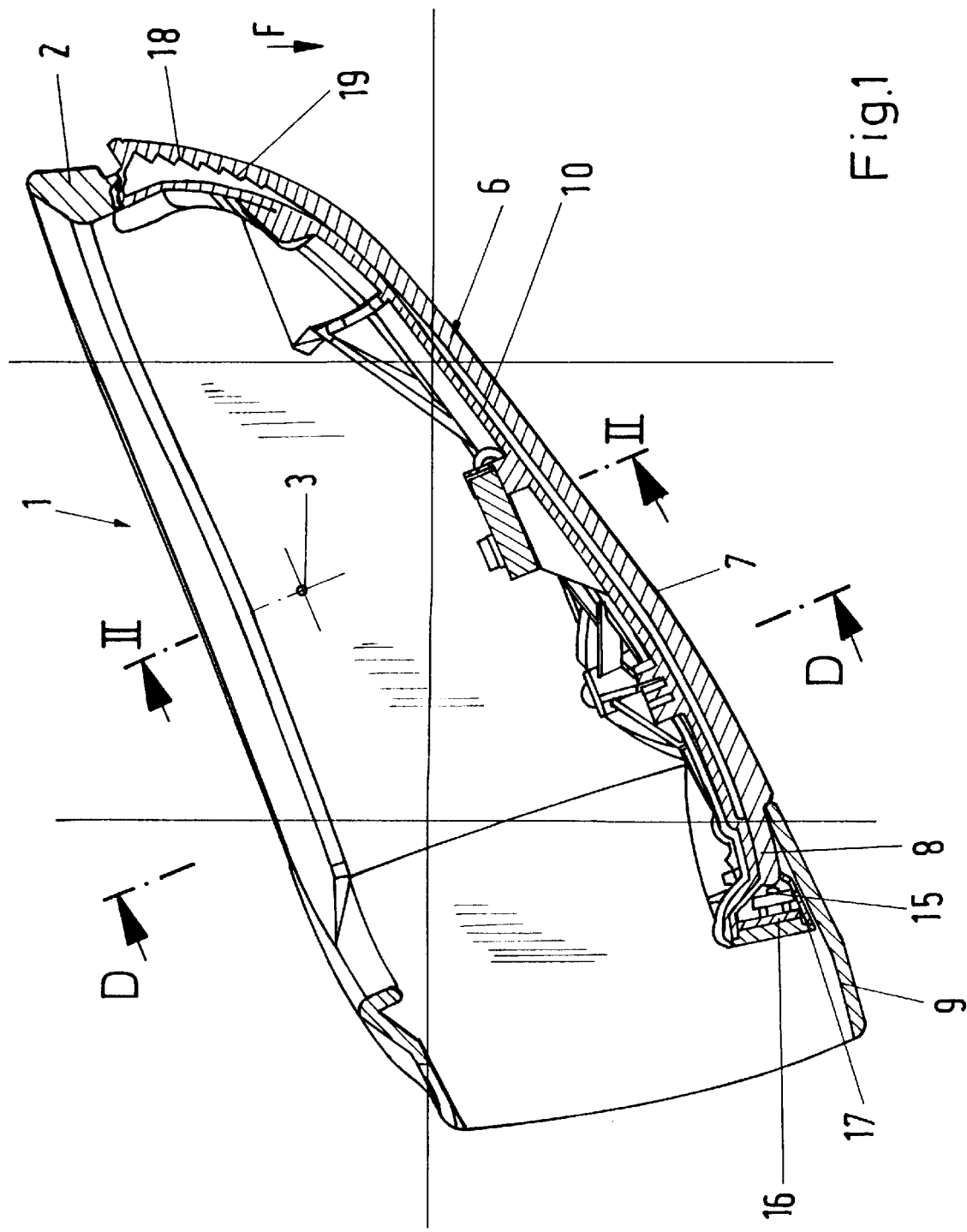
FIG. 1 is a cross-section of the mirror housing of the inventive exterior rearview mirror.

The exterior rearview mirror has a non-represented mirror leg which is used for connecting it to a vehicle, preferably a motor vehicle. The mirror leg has supported thereat a mirror head 1 which is preferably foldable in and counter to the travel direction of the vehicle by providing a joint between the mirror leg and the mirror head. The mirror head 1 has a mirror housing 2 in which, in a manner known per se, a non-represented mirror pane support with a mirror pane attached thereto is pivotably supported. The mirror pane and support are shown in FIG. 1 only schematically by the ball-and-socket joint 3 by which they are pivotably supported in the mirror housing 2. They can be manually or electro-motorically position-adjusted.

The mirror housing 2 has in the direction of travel F of the vehicle a wall 4 facing forward which has at least one outlet opening 5 in which at least one light guide or window 6 is arranged. In the shown embodiment the window 6 extends horizontally transverse to the direction of travel. It is shaped as a band and extends about half the width of the mirror housing 2.

Figure 2:
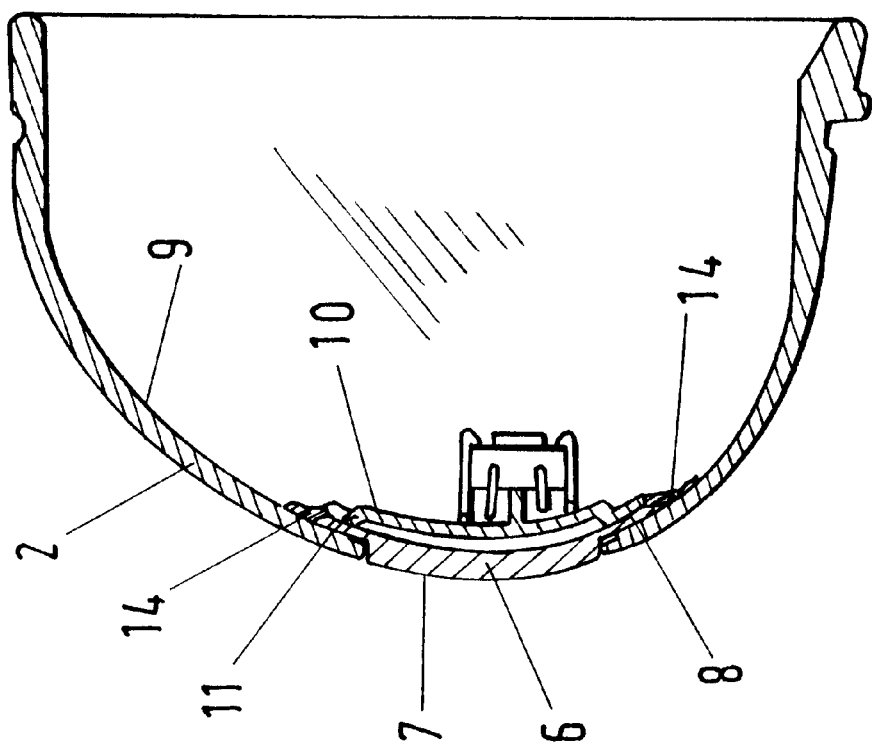
FIG. 2 shows a section along the line II—II of FIG. 1.
Figure 3:
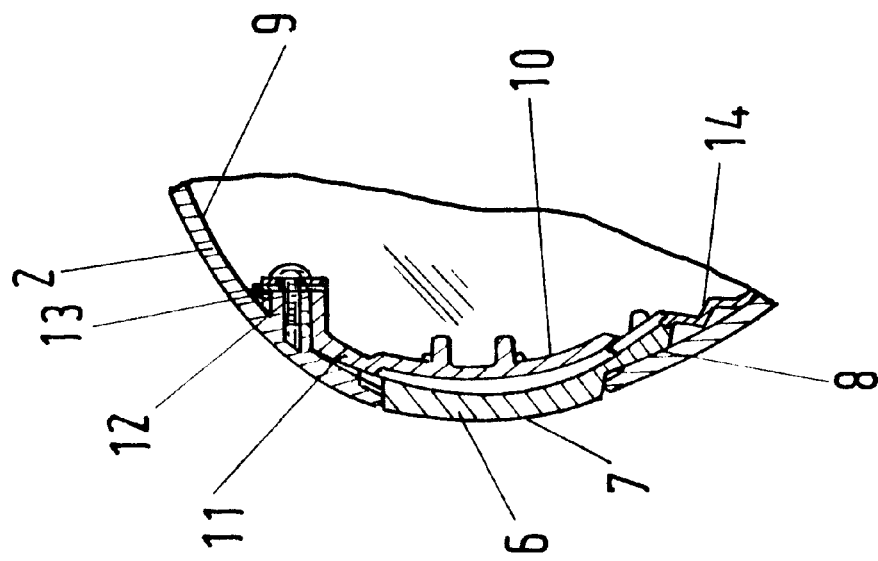
FIG. 3 shows a section of the fastening location of the light guide of the inventive exterior rearview mirror.

The window 6 is shaped such that its exterior side 7 (FIG. 2 and FIG. 3) forms at least approximately a continuous surface with the wall 4 of the mirror housing 2 in the area of the opening 5. The window 6 has a circumferentially extending edge portion 8 of reduced thickness with which it rests at the inside surface 9 of the mirror housing 2 (FIGS. 2 and 3). Of course, the edge portion 8 must not extend over the entire circumference of the window 6. Advantageously, the edge portion 8 can be provided only at portions of the circumference. Expediently, the edge portion 8 extends over the entire circumference of the window 6 and thus closes off the gap between the edge of the opening 5 and the window 6 so that dirt etc. can not enter the interior of the mirror housing 2. The edge portion 8 is curved across its width so as to match the curvature of the wall 4 of the mirror housing 2. Accordingly, it rests in the direction of its width with a large surface area at the inside surface 9 of the mirror housing 2. The window 6 is inserted from the interior of the mirror housing 2 into the opening 5 to such an extent that the edge portion 8 will come to rest at the inside surface 9 of the mirror housing 2. The edge portion 8 can be secured with an adhesive etc. at the inside surface 9 of the mirror housing 2. In order to provide for a simple exchangeability of the window 6, it is preferably detachably secured at the mirror housing 2. For this purpose, at least one holder 10 is provided which rests at the back side of the window 6 and is detachably connected to the mirror housing 2. The holder 10 is advantageously embodied such that it rests only at the edge portion 8 of the window 6 but is otherwise spaced from the window (see FIG. 1). The holder 10 is provided for this purpose with an edge 11 which rests on the edge portion 8 of the window 6. Advantageously, the edge 11 extends along the circumference of the holder 10. It is secured with at least one screw 12 (FIG. 3) at the mirror housing 2. For this purpose a projection 13 is provided which extends away from the inside surface 9. The screw 12 can be threaded into the projection 13. Additionally, the holder 10 is provided with a seal 14 that rests at the inner surface 9 of the mirror housing 2 (FIGS. 2 and 3). The seal 14 projects past the edge 11 of the holder 10 and prevents that light can be reflected away from the window 6 into the interior of the mirror housing 2 and be deflected to the rear.

The light guide or window 6 is connected to at least one light source 15 (FIG. 1) which is advantageously an LED. It is connected to a circuit board 16 which is arranged in a receiving member 17 at the inside surface 9 of the mirror housing 2. The light source 15 is provided at a narrow side of the substantially rectangular light window (light guide) 6. The light window (light guide) 6 is advantageously comprised of clear plastic material and guides the light emitted by the light source 15 to an end portion 18 which has profilings 19 at its inner side. Here the light is bundled, concentrated, and deflected to the exterior. As shown in FIG. 1, the end portion 18 is the end of the light window 6 remote from the vehicle. The end portion 18 projects from the outer contour of the mirror housing 2 in the outward direction away from the vehicle. The length of the end portion 18 measured transverse to the travel direction F can differ depending on the required specifications. The profilings 19 may extend over the entire length of the light window 6 so that the light can be distributed over the entire light window length to the exterior. The emitted light is easily visible. Since the light window 6 is positioned at the back side of the mirror housing 2, which faces forwardly with respect to the travel direction F, the light can be easily detected from the front of the vehicle and thus alerts oncoming traffic. The end portion 18 of the light window 6 in the shown embodiment is provided in the vicinity of the outer edge of the mirror housing 2 relative to the vehicle so that the emitted light can also be seen by traffic from the side of the vehicle.

The use of LEDs as a light source 15 has the advantage that only minimal heat is developed within the mirror housing 2. Furthermore, LEDs have a long service life. Also, LEDs are very robust, require only minimal space, and can be easily fastened. An LED can be easily mounted on the circuit board 16 by soldering.

The electrical supply line to the circuit board 16 is guided through the non-represented mirror leg of the exterior rearview mirror. Thus, an additional bore in the vehicle body for an electrical supply line is not required. Since an LED does not require a socket as does an incandescent light bulb, there are also no contacting and/or corrosion problems.

Figure 4:
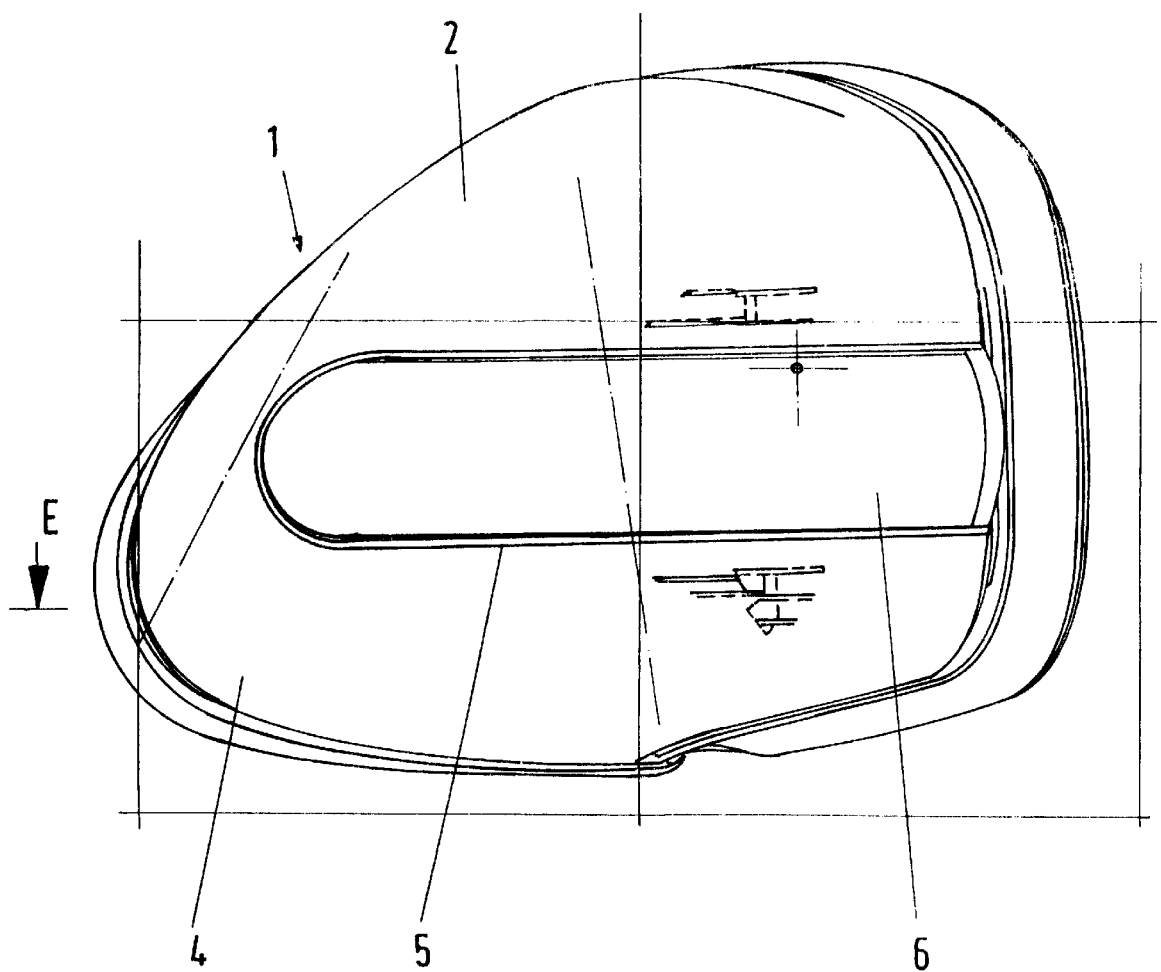
FIG. 4 shows a view onto the back of the mirror housing of the inventive exterior rearview mirror.
Figure 1:
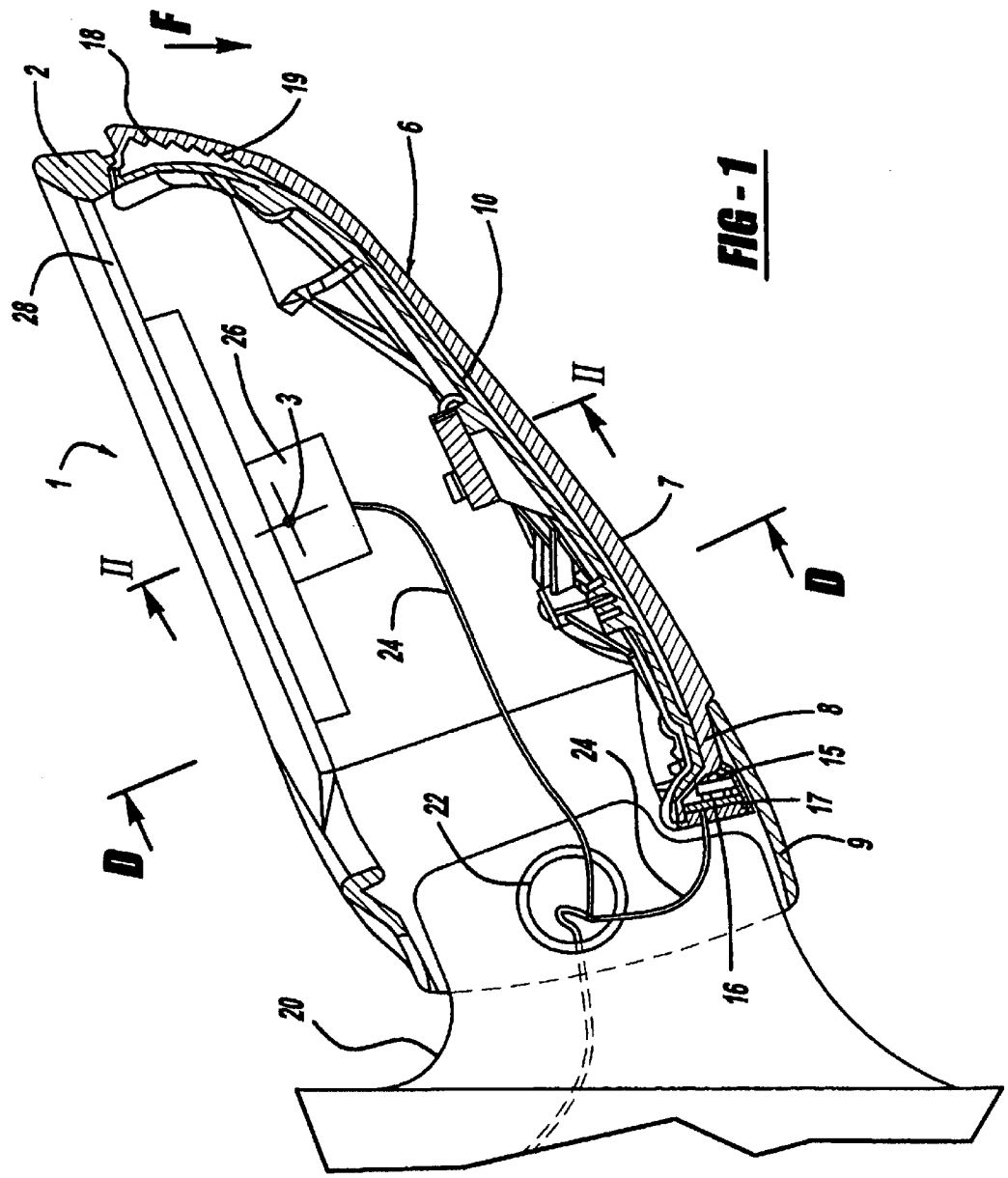

The light window 6, in deviation from the embodiment according to FIG. 4, may have any other suitable shape. For example, it is possible to provide a plurality of light windows at the back side of the mirror housing 2. The light window must not have a rectangular contour but can also have any other suitable contour. The light source 15 can be colored, so that differently colored light can be emitted by the light window 6.

The specification incorporates by reference the disclosure of German priority document 297 02 746.8 of Feb. 18, 1997.

The present invention is, of course, in no way restricted to the specific disclosure of the specification and drawings, but also encompasses any modifications within the scope of the appended claims.

What is claimed is:

1. An exterior rearview mirror for motor vehicles, said rearview mirror comprising:

a housing having an interior;

a mirror pane pivotably supported in said housing;

a light source mounted in said interior of said housing;

said housing of said rearview mirror having an outlet opening at a side of said housing opposite said mirror pane, and light emitted by said light source existing, through said outlet opening, in opposite direction from said mirror pane;

a light guide at least partially filling said outlet opening and connected within said interior of said housing to said light source.

2. A mirror according to claim 1, wherein said light guide completely fills said outlet opening.

3. A mirror according to claim 1, wherein said light guide consists of clear plastic material.

4. A mirror according to claim 1, wherein said light source is an LED.

5. A mirror according to claim 1, wherein said light guide has an outer side and wherein said outer side is positioned at least partially within an outer contour of said housing.

6. A mirror according to claim 1, wherein said light guide has a circumferential edge portion and wherein said circumferential edge portion rests at an inside surface of said housing.

7. A mirror according to claim 1, wherein said light guide has a main body and at least one support part, and wherein said support part rests at said inside surface of said housing.

8. An exterior rearview mirror for motor vehicles, said rearview mirror comprising:

a housing;

a mirror pane pivotably supported in said housing;

a light source mounted in said housing;

said housing having an outlet opening through which light emitted by said light source exits said housing;

a light guide at least partially filling said outlet opening and connected within an interior of said housing to said light source;

wherein said light guide has a main body and at least one support part, and wherein said support part rests at an inside surface of said housing;

wherein said support part is an edge portion of said light guide and extends at least partly along a circumference of said main body.

9. An exterior rearview mirror for motor vehicles, said rearview mirror comprising:

a housing;

a mirror pane pivotably supported in said housing;

a light source mounted in said housing;

said housing having an outlet opening through which light emitted by said light source exits said housing;

a light guide at least partially filling said outlet opening and connected within an interior of said housing to said light source;

wherein said light guide has a main body and at least one support part, and wherein said support part rests at an inside surface of said housing;

wherein said support part has a reduced thickness relative to a thickness of said main body.

10. A mirror according to claim 1, wherein said light guide is detachably mounted in said housing.

11. An exterior rearview mirror for motor vehicles, said rearview mirror comprising:

a housing;

a mirror pane pivotably supported in said housing;

a light source mounted in said housing;

said housing having an outlet opening through which light emitted by said light source exits said housing;

a light guide at least partially filling said outlet opening and connected within an interior of said housing to said light source, said light guide detachably mounted in said housing; and at least one holder securing said light guide at said housing.

12. A mirror according to claim 11, wherein said at least one holder is detachably secured at an inside surface of said housing.

13. A mirror according to claim 12, wherein said at least one holder includes at least one seal resting at said inside surface of said housing.

14. A mirror according to claim 11, wherein said at least one holder is spaced from said light guide within an area of said outlet opening.

* * * * *

(12) EX PARTE REEXAMINATION CERTIFICATE (7705th)
United States Patent
Zimmermann et al.

(10) Number: US 6,099,153 C1
(45) Certificate Issued: Aug. 31, 2010

(54) EXTERIOR REARVIEW MIRROR FOR VEHICLES, PREFERABLY MOTOR VEHICLES

(75) Inventors: Werner Zimmermann, Ottenbach (DE); Bernd Waldmann, Nuertingen (DE); Helmut Eberspächer, Esslingen (DE)

(73) Assignee: Reitter & Schefenacker GmbH & Co. KG, Esslingen (DE)

Reexamination Request:
No. 90/006,187, Jan. 11, 2002

Reexamination Certificate for:
Patent No.: 6,099,153
Issued: Aug. 8, 2000
Appl. No.: 09/025,379
Filed: Feb. 18, 1998

(30) Foreign Application Priority Data

Feb. 18, 1997 (DE) .................................... 297 02 746 U

(51) Int. Cl.
*B60Q 1/26* (2006.01)
*B60R 1/12* (2006.01)
*F21S 8/10* (2006.01)

(52) U.S. Cl. .......................... 362/494; 362/511; 362/545

(58) Field of Classification Search .................. 362/494, 362/135, 140–144, 492, 503, 511, 545, 555, 362/560, 602, 634; 359/844
See application file for complete search history.

(56) References Cited

U.S. PATENT DOCUMENTS

| 1,973,908 | A | * | 9/1934 | McIlwee | 362/141 |
| 2,295,176 | A | * | 9/1942 | Kelly | 362/494 |
| 2,580,014 | A | * | 12/1951 | Gazda | 362/494 |
| 2,595,331 | A | * | 5/1952 | Calihan et al. | 362/494 |
| 2,600,751 | A | * | 6/1952 | Gazda | 362/494 |
| 4,274,078 | A | * | 6/1981 | Isobe et al. | 362/494 |
| 4,792,884 | A | | 12/1988 | Suman et al. | 362/135 |
| 4,929,866 | A | | 5/1990 | Murata et al. | 313/500 |
| 5,059,015 | A | * | 10/1991 | Tran | 362/135 |
| 5,313,335 | A | * | 5/1994 | Gray et al. | 362/135 |
| 5,371,659 | A | * | 12/1994 | Pastrick et al. | 362/494 |
| 5,402,103 | A | * | 3/1995 | Tashiro | 362/494 |
| 5,497,306 | A | * | 3/1996 | Pastrick | 362/494 |
| 5,709,453 | A | * | 1/1998 | Krent et al. | 362/496 |
| 5,774,283 | A | * | 6/1998 | Nagel et al. | 359/838 |
| 5,788,357 | A | * | 8/1998 | Muth et al. | 362/494 |
| 5,938,320 | A | * | 8/1999 | Crandall | 362/494 |

FOREIGN PATENT DOCUMENTS

| CN | 2176933 Y | 9/1994 |
| DE | 4228877 A1 | 3/1893 |
| DE | 35 42 292 A1 | 7/1986 |
| DE | 19538771 A1 | 4/1997 |
| EP | 0 858932 A2 | 8/1998 |
| JP | 63-210692 | 9/1986 |
| JP | 8-268188 | 10/1996 |
| JP | 63-210691 | 9/1998 |

OTHER PUBLICATIONS

Honda to Debut Super Blackbird, Motorcycle Consumer News Magazine, Oct. 1996, p. 5.
Simon Hargreaves, Cycle World Magazine, King of Speed, Dec. 1996, pp. 48–49.
Joe Bloggs, 1997 Honda CBR1100XX, Motorcycle Consumer News Magazine, Dec. 1996, p. 13.
Bill Stermer, Double X, Rider Magazine, Jan. 1997, pp. 26–32.
Jody Nicholas, Honda CBR 1100XX vx. Kawasaki ZX–11, Motorcycle Consumer Magazine, Apr. 1997, pp. 10–17.

(Continued)

*Primary Examiner*—Christina Y Leung

(57) ABSTRACT

An exterior rearview mirror for motor vehicles has a housing and a mirror pane pivotably supported in the housing. A light source is mounted in the housing. The housing has an outlet opening through which light emitted by the light source exits the housing. A light guide at least partially fills the outlet opening and is connected within the interior of the housing to the light source.

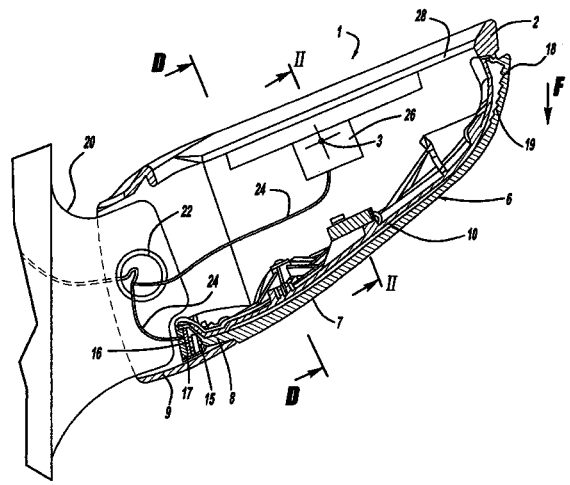

OTHER PUBLICATIONS

Brian Catterson, Birds of Pray, Cycle World Magazine, Jun. 1999, pp. 36–44 and 46.
David Edwards, Honda NR750 We Ride the Oval Piston Wonder, Cycle World Magazine, Aug. 1994, pp. 30–35.
Cheap Trick, Bike Magazine, Jan. 1992, pp. 6–7.
Tim Thompson, Half Man Half Bimbo, Bike Magazine, Jan. 1992, pp. 66–69.
Kevin Cameron, NR 750, Honda's Oval–Piston, Carbon–Fiber, $60,000, Corporate Statement, Cycle World Magazine, Jan. 1992, pp. 30–35.
Allen Cathcart, Aboard the NR Express, Cycle World Magazine, pp. 48–51.
Kevin Cameron, The NR Legacy, Oval Pistons Past Present and Future, Cycle World Magazine, pp. 37–38.
Mark Tuttle, Jr., Kickstart, Rider Magazine, Oct. 1996, p. 10.
Brian Catterson, Super Blackbird, Honda's CBR1100XX Heats Up The Speed Wars, Cycle World Magazine, Jan. 1997, pp. 38–42.
Riding Impression, Honda CBR1100XX, Cycle World Magazine, p. 34.
Honda CBR1100XX.
Jason Black, Full Speed Ahead, Honda CBR1100XX v. Kawasaki ZX–11: Don't Blink—You'll Miss 'Em., Sportbike Magazine, 1997, pp. 42–44.
Nick Ienatsch, Tripple X Maximum Blackbird, Cycle World Magazine, pp. 44 and 46.
John F. Thompson, The Roadburners, Heft Plus Horsepower Equals Happiness, Cycle World Magazine, Jul. 1997, pp. 36–39.
Long–Term Update Honda CBRXX, Cycle World Magazine, Feb. 1998.
Long–Term Wrap–Up Honda CBR1100XX Stealth Speedster, Cycle World Magazine, pp. 56–58.
Honda CBR1100XX, Cycle world Magazine, 2003.
Black Bird Bye Bye, Honda CBR1100XX, Cycle World Magazine, Dec. 1998.
Honda, Rider Magazine, Dec. 1998.
Jay Koblenz, Fastest Bike . . . For Now, Motorcycle Consumer News Magazine, Apr. 1999, pp. 34–35.
Ken Freund, Ridden & Rated Black Beuty the 1999 Honda CBRXX, Rider Magazine, Apr. 1999, pp. 54–55.
Jason Colon, Rocketsleds, G–Force Sport–Touring on a Honda CBR1100XX Super Blackbird, Kawasaki, Ninja ZX–12R and Suzuki GSX1300R Hayabusa.,Sportbike Magazine, 2000, pp. 36–46.
Bill Stermer, The AM FM Tour, Can We Find Happiness on Absurdly Fast Motorcycles, Rider Magazine, Oct. 2001, pp. 45–50.
Mark Hoyer, Thrust, Life, liberty and High–Speed Pursuit of Happiness, Cycle World Magazine, Jun. 2002, pp. 40–44.
Kevin Cameron, Super Blackbird, Honda's Steamin' CBR1100XX Debuts, Cycle World Magazine, 1996, pp. 28–31.
Kevin Cameron, Oval–Piston Endurance Racer: Honda's NR750, Cycle World Magazine, Aug. 1987, pp. 62–65 and 68.
Allen Cathcart, The start of a sportbike revolution? Honda NR750, Cycle World Magazine, Aug. 1987, pp. 29–33.
Allen Cathcart, Honda NR750, How do you pet a 155–Horsepower pussycat? Carefully, very carefully, Cycle World Magazine, Aug. 1987, pp. 34–37.
Dain Gingerelli, Honda NR750 Another Oval–Piston Wonder Comes Around, Cycle Guide Magazine, p. 74.
Tokyo Show Japan goes crazy! Cycle Magazine, Jan. 1990, p. 28.
David Edwards, Stars of the Tokyo Motor Show, Jan. 1990, p. 17.
Brian Catterson, 1997 Honda CBR 1100XX Super Backbird Sighted, Cycle World Magazine, pp. 22–23.
Mark Tuttle, Jr., One–Track Mind, Bake Away, Rider Magazine, Jan. 1997, p. 8.
Nick Ienatsch, Mr. Tubo Honda CBR1100XXS The Blackbird Gets a Boost, Cycle World Magazine, Sep. 1997.
Doug Jackson, Japan's Home Market Honda Sportbikes and Scooters,Motorcycle Consumer News Magazine, Sep. 2001, p. 11.
Miscellaneous Mirror Photographs. 10 pages.

* cited by examiner (AMENDED)

US 6,099,153 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 30-42:

The exterior rearview mirror has a [non-represented] mirror leg *or bracket 20* which is used for connecting it to a vehicle, preferably a motor vehicle. The mirror [leg] *bracket 20* has supported thereat a mirror head 1 which is preferably foldable in and counter to the travel direction of the vehicle by providing a *pivot member 22 or* joint between the mirror [leg] *bracket 20* and the mirror head. The mirror head 1 has a mirror housing 2 in which, in a manner known per se, a [non-represented] mirror pane *28* supported with a mirror pane attached thereto is pivotably supported. The mirror pane [and support are shown in FIG. 1 only schematically by the ball and socket joint 3 by which they are] *28* pivotably supported *at a joint 3 by an electric actuator 26 or adjustment mechanism* in the mirror housing 2. They can be manually or electro-motorically position-adjusted.

Column 3, lines 59-64:

[The] *A* wiring harness *24 or* electrical supply *is connected* to the circuit board 16 *and* is guided through the [non-represented mirror leg of the exterior rear view mirror] *pivot member 22*. Thus, an additional bore in the vehicle body for an electrical supply line is not required. Since an LED does not require a socket as does an incandescent light bulb, there is also no contacting and/or corrosion problems.

THE DRAWING FIGURES HAVE BEEN CHANGED AS FOLLOWS:

In FIG. 1, elements 20, 22, 24, 26 and 28 are added.

AS A RESULT OF REXAMINATION, IT HAS BEEN DETERMINED THAT:

Claims 1-14 are cancelled.

\* \* \* \* \*